G. E. Noyes,
Pug Mill.
No. 101,154. Patented Mar. 22, 1870.

Witnesses
Inventor
G. E. Noyes

United States Patent Office.

GEORGE E. NOYES, OF WASHINGTON, DISTRICT OF COLUMBIA.

Letters Patent No. 101,154, dated March 22, 1870.

IMPROVEMENT IN PUG-MILLS.

The Schedule referred to in these Letters Patent and making part of the same.

To all whom it may concern:

Be it known that I, GEORGE E. NOYES, of the city and county of Washington, in the District of Columbia, have invented certain Improvements in Pug-Mills; and I do hereby declare that the following is a full, clear, and exact description thereof, reference being had to the annexed drawings making part of this specification, in which—

Corresponding letters refer to corresponding parts in both figures.

Figure 1:
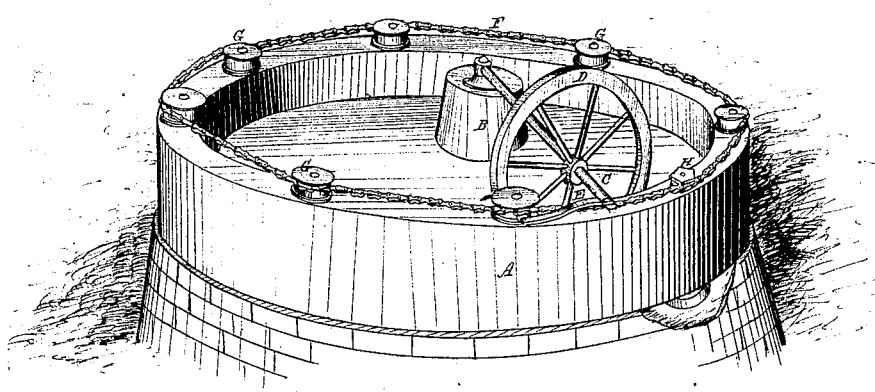
Figure 1 is a perspective view of my improved mill, showing the bed or pit for the material to be operated upon, the tempering-wheel, and the mechanism for operating the same.

In pug-mills of this class, great inconvenience has arisen from the fact that the machinery which drives them has been placed above the bed or pit, thus interfering with the filling and discharging of the same, and at the same time adding largely to the expense, from the fact that complicated frame-work is required for the support of such machinery.

My object is to provide a remedy for the above recited objections; and to this end The invention consists in a pug-mill, the tempering-wheel of which is driven by an endless chain which passes around sheaves or pulleys secured to the upper surface of the pit or bed in which the clay is placed to be operated upon; and It further consists in the combination and arrangement of the parts of which the mill is composed, as will be more fully explained hereinafter.

A, in the drawings, refers to the pit or bed in which the clay or other material to be operated upon is to be placed.

The form of this pit is clearly shown in fig. 1, and it may be of any diameter and height required, to hold the amount of material which it may be desirable to operate upon at one time.

This pit may be made of stone, wood, or any other suitable material, it being provided at its center with a hub or projection to which the pivot B' is attached, upon which pivot the shaft C, which carries the tempering-wheel D, rotates.

The inner end of the shaft C is provided with a boss, through which an aperture is made, to permit it to pass over a pivot or pin secured to the hub B, from which point it extends outward to a point outside of the sheaves or roller, around which the chain passes.

Upon that portion of this shaft which is between the outer surface of hub B and the inner surface of the pit or bed A, the tempering-wheel D is placed, it being fitted to such shaft in such a manner as to admit of its longitudinal movement thereon, as well as its rotative movement.

The outer end of this shaft is connected with the endless chain F by a link, E, in such a manner that as the sprocket-wheel H is rotated, and the chain moved around, the tempering-wheel D, is caused to rotate thereon, and as it may be made to describe any circle within the limits of the space in which it moves, it follows that all the material within the pit may be operated upon by changing the position of such wheel upon the shaft C.

The endless chain F is composed of a series of links of suitable length, and riveted or bolted together at their ends, each alternate link consisting of a single bar of iron, and of two bars secured to the single bar in the manner above described.

This chain passes around the sheaves or pulleys G, which are made to revolve upon pins or shafts, secured to the pit A, and projecting from its upper surface, as clearly shown in the drawings.

The sheaves serve to keep the chain always in position, and permit to move with a small amount of friction, it being driven by the sprocket-wheel H, which is secured to the upper end of a vertical shaft, which passes down through, and has its bearings in the rim of the pit.

Figure 2:
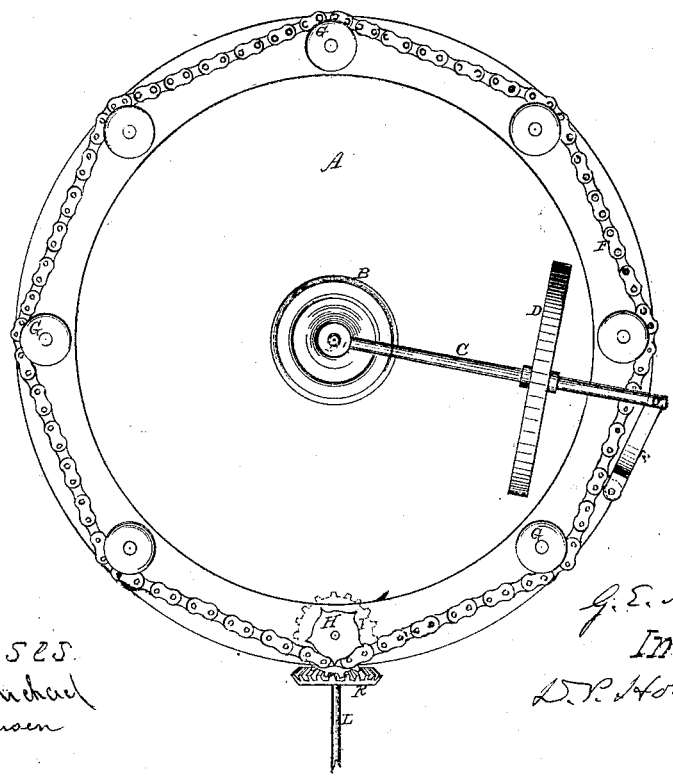
Figure 2 is a plan or top view, showing the chain by which the tempering-wheel is moved, and the gearing for driving the same.

Upon the lower end of this shaft there is placed a beveled gear-wheel, which may be driven by another or corresponding wheel to be placed upon any horizontal shaft, as shown in fig. 2 of the drawings.

It will be seen that as a consequence of the use of an endless chain in this connection, I am enabled to dispense with the gear-wheels usually employed for such purposes, and that by doing so a large percentage of the first cost is saved, and also a large percentage of the cost of repairs, as gear-wheels in such positions are always exposed to rapid wear, in consequence of the amount of earthy matter which unavoidably settles upon them; and, further, that as a consequence of the combination and arrangement of its parts the cumbrous and annoying frame-work above the machine may be dispensed with, there being no necessity for such work, as there are no parts to be supported by it; and, further, that all covering may be dispensed with, if found desirable, as the mill is in no sense dependent upon any building in which it may be placed; and lastly, that when made of wood it may be taken up and removed to a new locality without deranging any of its parts.

This machine may, if so desired, at any time be converted into a horse-power by simply hitching horses to the end of the shaft C, or at any point on the endless chain, and connecting the shaft L to the machinery which is to be driven.

Having thus described my invention,

What I claim, and desire to secure by Letters Patent, is—

1. The employment of an endless chain with its connections, substantially as herein shown, for the purpose of driving the pug-mill, substantially as set forth.

2. In a pug-mill for tempering clay and other materials, the combination of the endless chain F, the pulleys or sheaves G, sprocket-wheel H, the connecting-link E, the shaft C, and tempering-wheel D, substantially as and for the purpose set forth.

In testimony whereof I have signed my name to this specification in the presence of two subscribing witnesses.

G. E. NOYES.

Witnesses:
F. H. SPRAGUE,
B. EDW. J. EILS.